United States Patent
Sullivan

(10) Patent No.: US 7,147,383 B2
(45) Date of Patent: Dec. 12, 2006

(54) OPTICAL POLARITY MODULES AND SYSTEMS

(75) Inventor: Keith D. Sullivan, Berlin (DE)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/020,730

(22) Filed: Dec. 22, 2004

(65) Prior Publication Data

US 2006/0133736 A1   Jun. 22, 2006

(51) Int. Cl.
*G02B 6/36* (2006.01)

(52) U.S. Cl. .......................... 385/59; 385/55; 385/58; 385/56; 385/76; 385/77

(58) Field of Classification Search ................ 385/55, 385/58, 56, 59
See application file for complete search history.

(56) References Cited

U.S. PATENT DOCUMENTS

| 6,758,600 | B1 * | 7/2004 | Del Grosso et al. | .......... 385/71 |
| 6,869,227 | B1 * | 3/2005 | Del Grosso et al. | .......... 385/71 |
| 2004/0184741 | A1 | 9/2004 | Del Grosso et al. | |
| 2005/0207709 | A1 * | 9/2005 | Del Grosso et al. | .......... 385/71 |

* cited by examiner

*Primary Examiner*—Frank G. Font
*Assistant Examiner*—James P. Hughes
(74) *Attorney, Agent, or Firm*—Jeffrey S. Bernard

(57) ABSTRACT

A module and harness are described that allow for connectors in each to be mated with other connectors in a key up to key down orientation. The module and harness may also be a part of a larger optical assembly. The optical fibers in the module and harness connect a multi-fiber ferrule on one end with a plurality of connectors on the other end, at least some of adjacent optical fibers extending from the multi-fiber ferrule are not connected with adjacent connectors at the other end.

12 Claims, 3 Drawing Sheets

OPTICAL POLARITY MODULES AND SYSTEMS

The present invention relates to optical fiber interconnection modules, for example, to interconnection modules for use in a local area network (LAN).

BACKGROUND OF THE INVENTIONS

Conventional fiber optic cables comprise optical fibers that conduct light to transmit voice, video, and data information. An optical ribbon includes a group of optical fibers that are coated with a ribbon common layer, which may be of the ultraviolet (UV) light curable type. Typically, such a ribbon common layer is extruded about a group of individually colored optical fibers that have been arranged in a planar array, and is then irradiated with a UV light source that cures the ribbon common layer. The cured ribbon common layer protects the optical fibers and generally aligns the respective positions of optical fibers in the planar array. Optical fiber ribbons can be connected to multi-fiber connectors, for example, MTP connectors. MTP connectors can be used in LAN applications, for example, data centers and parallel optics interconnects between servers.

The present invention addresses the need for a fiber optic interconnection solution for multi-fiber connectors in the LAN environment. Conventional networking solutions, which utilize a 12-fiber MTP connector assembly, for example, are configured in a point-to-point system. Fiber polarity, i.e., based on a given fiber's transmit-to-receive function in the system, may be addressed by flipping fibers in one end of the assembly just before entering the multi-fiber connector in an epoxy plug, or by providing "A" and "B" type break-out modules where the fiber is flipped in the "B" module and straight in the "A" module.

System problems can occur when the MTP assembly is used in an interconnect construction. Fiber polarity is taken back out of the system when MTP assemblies are interconnected. FIG. 1 illustrates a conventional module "A" having six fiber pairs matched as follows: 1–2; 3–4; 5–6; 7–8; 9–10; and 11–12. All of the fiber pairs are defined by fibers that are immediately adjacent to one another in the optical fiber ribbon. The fiber pairs are routed to multi-fiber or single-fiber connectors 13 within module A, fiber 1 is immediately adjacent to fiber 2, fiber 3 next to fiber 4, and so on. Module A is used in a system utilizing an "A" and "B" type module approach where the fibers in the "B" module are flipped with respect to the fibers in module A to address, or correct for, fiber polarity.

In an effort to reduce implementation confusion, complexity and stocking issues with the "A" and "B" module method, or fiber flipping before entering the connector, another module available from the assignee of the present application is illustrated in FIG. 2. This module 60 is the subject of U.S. Pat. No. 6,758,600, the contents of which are incorporated by reference herein. In this module, a fiber sequence was devised that eliminated the need for an "A" and "B" module approach and replaced it with a universal wiring module. In the universal wiring module, the fibers from the optical fiber ribbon 20 are matched up (using the same numbering as in FIG. 1) 1–12; 2–11; 3–10; 4–9; 5–8; and 6–7 and illustrated in FIG. 2 as 21–32, 22–31, 23–30, 24–29 25–28, and 26–27 going to connectors 51–56 in breakout section 50. However, the MTP connector 40 in that universal module was mated key up to key up to another MTP connector, which suggests a flat polish on the end faces for the key up to key up orientation. As noted above, MTP connectors are typically connected in a key up to key down orientation, not in a key up to key up orientation. In an effort to adhere to the convention in MTP connectors of key up to key down mating, a new universal wiring module has been devised. Additionally, the reflectance performance of flat polished ferrules in the connectors is not sufficient for certain applications. Rather, a higher degree of optical performance (measured in dB drop) is required in certain systems.

Accordingly, the present invention is directed to a module that substantially obviates one or more of the potential problems and disadvantages in the prior art. Additional features and advantages of the inventions will be set forth in the description that follows, and in part will be apparent from the description, or may be learned by practice of the invention. The objectives and other advantages of the inventions will be realized and attained by the apparatus and process particularly pointed out in the written description and claims, as well as the appended drawings.

SUMMARY OF THE INVENTION

To achieve these and other advantages and in accordance with the purpose of the inventions as embodied and broadly described herein, an optical interconnection module is provided that includes an enclosure defining at least two walls, an optical interconnection section formed in one of the at least two walls of said enclosure, the optical interconnection section having a first multi-fiber connector with a plurality of optical fibers extending therefrom, the multi-fiber connector having an orientation key and an end face configured to define a predetermined angle, the predetermined angle being positioned relative to the orientation key, an optical connector station formed in the other of the at least two walls of said enclosure, the optical connector station having a plurality of optical fiber connectors, and the first multi-fiber connector and the plurality of optical fiber connectors being optically interconnected by the optical fibers extending from the first multi-fiber connector disposed in said enclosure, at least two optical fibers connected to the multi-fiber connector immediately adjacent one another are connected to optical fiber connectors in the optical connector station that are not immediately adjacent one another.

In another aspect, the invention provides for an optical interconnection module that includes an enclosure defining at least two walls, an optical interconnection section formed in one of the at least two walls of the enclosure, the optical interconnection section having a first multi-fiber connector with a plurality of optical fibers extending therefrom, the multi-fiber connector having an orientation key, an optical connector station formed in the other of the at least two walls of the enclosure, the optical connector station having a plurality of optical fiber connectors, and the first multi-fiber connector and the plurality of optical fiber connectors being optically interconnected by the optical fibers extending from the first multi-fiber connector disposed in the enclosure, at least two optical fibers connected to the multi-fiber connector immediately adjacent one another are connected to optical fiber connectors in the optical connector station that are not immediately adjacent one another, and wherein a connection of the first multi-fiber connector to another multi-fiber connector has a reflective performance of about $\leq -65$ dB.

In another aspect of the invention, an optical interconnection harness includes a first end having a multi-fiber connector, the multi-fiber connector having an orientation key and an end face configured to define a predetermined angle, the predetermined angle of the end face being positioned relative to the orientation key on the multi-fiber connector, and a second end, the second end having a plurality of optical fiber connectors positioned relative to one another, and a plurality of optical fibers connecting the multi-fiber connector and the plurality of optical fiber connectors such that at least two optical fibers connected to the multi-fiber connector immediately adjacent to one another are connected to optical fiber connectors in the second end that are not immediately adjacent one another.

In another aspect of the invention, an optical assembly includes at least two optical interconnection modules, the modules being optically interconnected by optical paths, the optical paths being established through connectors having orientation keys being positioned on the connectors and each of the connectors having an end face configured to define a predetermined angle, the end face in each of the connectors being positioned in the same position relative to the orientation keys, and the connectors being mated to one another with the orientation keys in an orientation opposite to one another.

It is to be understood that the foregoing general description and the following detailed description are exemplary and explanatory and are intended to provide further explanation of the invention as claimed.

The accompanying drawings are included to provide a further understanding of the invention and are incorporated in and constitute a part of the specification. The drawings illustrate several embodiments of the invention and together with the description serve to explain the principles of the invention.

DETAILED DESCRIPTION OF THE INVENTIONS

Figure 3:
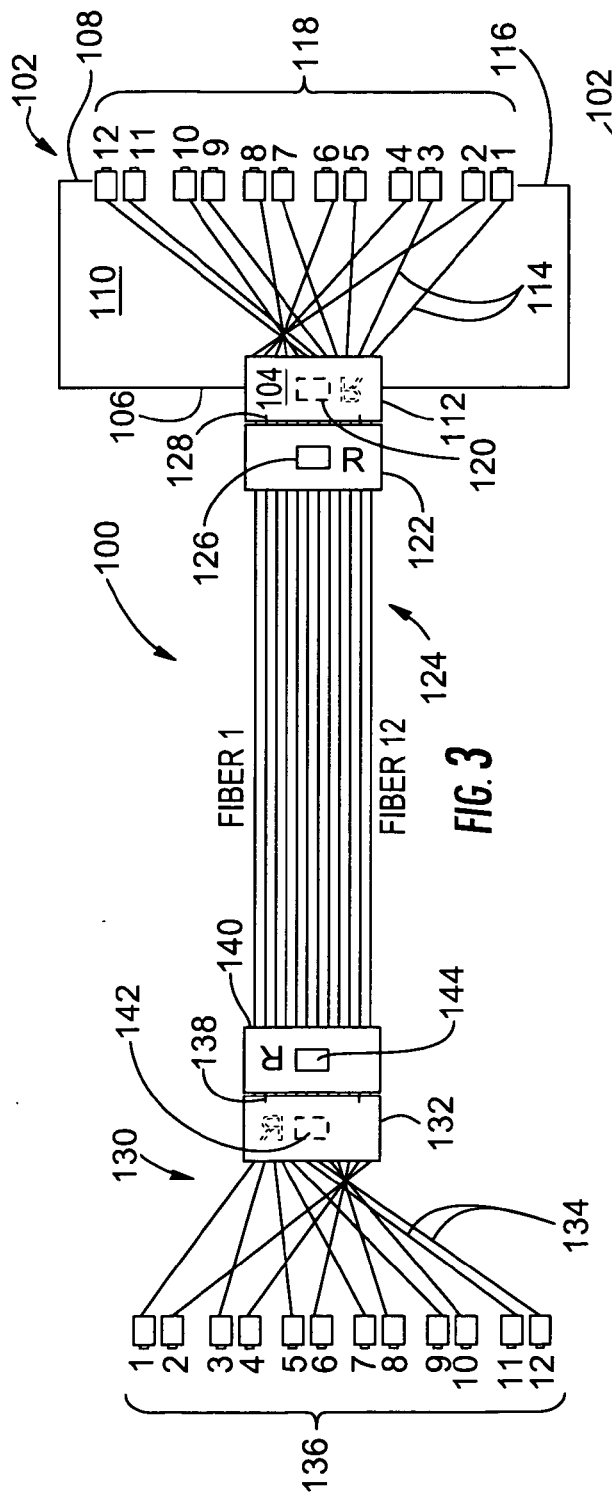
FIG. 3 is a schematic view of a first optical assembly system according to the present invention.

An embodiment of an optical assembly system 100 that includes an optical connection module 102 according to the present invention is illustrated in FIG. 3. The module 102 can be an optical networking module for use with an optical fiber ribbon, for example having twelve optical fibers, connected to, for example, an MTP or MPO optical connector 104. The module 102 preferably has at least two walls 106,108 to define a cavity 110, but may also have four walls to enclose the cavity 110. The module 102 preferably has an optical connection section 112 in one of the walls that includes the optical connector 104. The preferred, exemplary connector is an MTP or MPO connector 104. Connectors 104 are epoxy and polish compatible multi-fiber connectors, for example, a part of Corning Cable Systems' LANScape® solution set. The exemplary epoxy and polish connector 104 is a twelve-fiber connector achieving very high density in a small space. The connector 104, as is known in the art, may have a front face that is configured with an angled end face. The end face is typically polished or otherwise configured to about an 8° angle. The angled end face, when mated with a connector with the same angled end face, polished with the same orientation with respect to an orientation key, allows for better reflective performance of the connector pair. The reflective performance of two mated, angled connectors is usually about ≦−65 dB, which may be a requirement for an installed system.

The connector 104 has optical fibers 114 passing therethrough and extending out the back of the connector, usually in a ribbonized format. The optical fibers 114 are secured in the connector 104 and the front face of the connector 104 is polished with the optical fibers flush with the front face of the connector. The optical fibers 114 are then routed from the connector 104 through the module 102 to a break-out section 116 that holds a plurality of connectors 118. The connectors 118 are preferably single fiber LC connectors that are duplexed together. However, any appropriate connector may be used and they may or may not be duplexed together at the break-out section 116.

The connector 104 is illustrated in FIG. 3 with the orientation key 120 in a key down orientation, while the connector 122 to which it connects, shown attached to a non-standard optical fiber trunk line 124, as will be described in greater detail below, is oriented with the orientation key 126 in a key up orientation. It should also be noted that the connector 104 has guide pins 128 installed so it can mate with the connector 122. When both of the connectors 104 and 122 have angled end faces (typically about an 8° angle), the reflective performance is better than if the end faces of the connectors 104,122 were flat (about a 0° angle). However, the present invention is not dependent on the exact angle of the end face of the connectors, and any combination of mated end faces having the same angle are within the merits of present invention.

The invention may also be embodied in a harness 130, which is schematically shown in FIG. 3. The harness, as is known in the art, is a flexible assembly of connectors and optical fibers. In the present invention, a preferred embodiment of a harness 130 includes a multi-fiber connector 132, and optical fibers 134 extending from the connector 132 to a plurality of fiber optic connectors 136. The optical fibers 134 typically have a covering or sleeve to protect them during handling and routing that is omitted for clarity. The fiber optic connectors 136 may or may not be all connected to one another, but pairs of connectors (one for transmitting and one for receiving a signal) are usually held together by a holder. The connector 132 also has guide pins 138 to assist in alignment of the connector 132 with the connector 140 in the representative trunk line 124. The mating of the connectors 132,140 is also done in a key up to key down orientation, with the key 142 on connector 132 facing down and the key 144 on connector 140 facing up. The connectors 104 and 122, as well as connectors 132 and 140, are preferably connected to each other using standard MTP adapter sleeves. There is no need, as with the prior art system, to have a specialized adapter sleeve to allow for a key up to key up orientation of the connectors. Thus, the connections may be made with the standard equipment.

It should also be noted that the routing of the optical fibers in the module 102 and the harness 130 are routed in the same way. With reference to FIG. 3, with the key in the down position, the blue fiber (fiber 1) is on the left (following the fiber into the MTP connector 104—which is standard for MTP connectors) and is routed from the first position or first fiber optic connector (1) in break-out section 116 into that first position in the connector 104. The second fiber from the second connector (2) in break-out section 116 is then routed to the twelfth position in the connector 104. The third fiber from the third connector (3) is then routed into the second position in the connector 104 and the fourth fiber from the fourth connector (4) is routed into the eleventh position in the connector 104. This process continues through all twelve fibers. The optical fibers in the trunk line 124 are arranged straight through from the connector 122 to the connector 140, i.e. without twist. It should be noted that the fibers are inserted in the standard order into connector 140 based on the key up orientation of the connector, but they are considered to be reversed in connector 122, where the blue fiber (fiber 1) is in position 12 and the aqua fiber (fiber 12) is in position 1. While a harness 130 is illustrated at one end of assembly 100 and a module 102' on the other end of assembly 100, the ends of the assembly 100 may both be harnesses or both be modules and still fall within the scope of the present inventions.

Routing the fibers through the assembly 100 will now be described. At the end of assembly 100 with module 102, the fiber from the first connector 118 in break-out section 116 is routed through connectors 104 and 122 to the bottom fiber (fiber 12) in the trunk 124, through connectors 140 and 132 to the second connector of the connectors 136. Similarly, the optical fiber from the second of the connectors 118 in break-out section 116 is routed through connectors 104,122 to the top fiber (fiber 1) in the trunk 124, through the connectors 140,132 and to the first connector of the connectors 136. In this manner, the polarity of the fibers is maintained from one end of the system 100 to the other. This process is followed for the remainder of the optical fibers and the fibers are therefore routed in the universal manner, i.e, 1–12; 2–11; 3–10; 4–9; 5–8; and 6–7.

Figure 1:
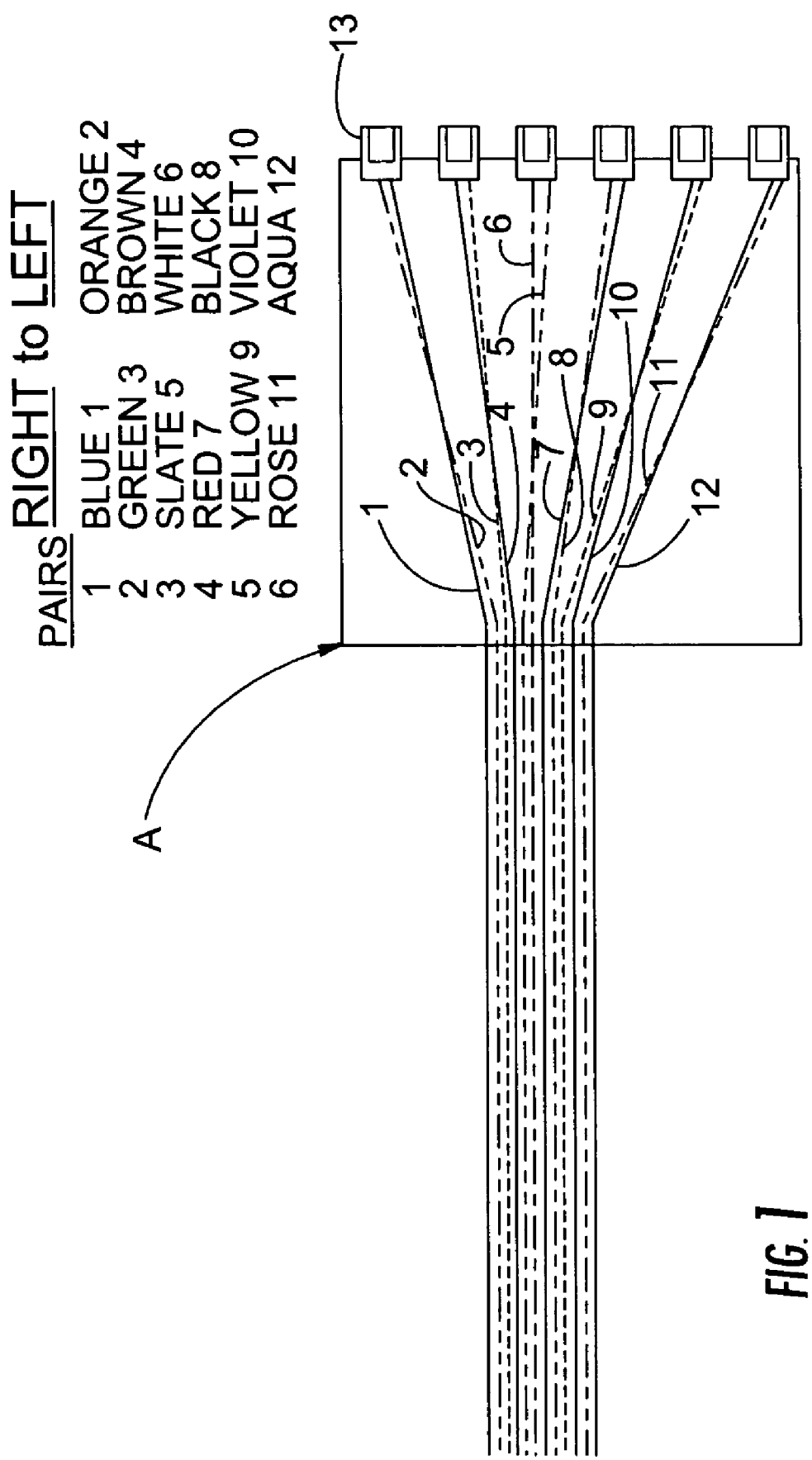
FIG. 1 is a schematic view of a conventional module.
Figure 2:
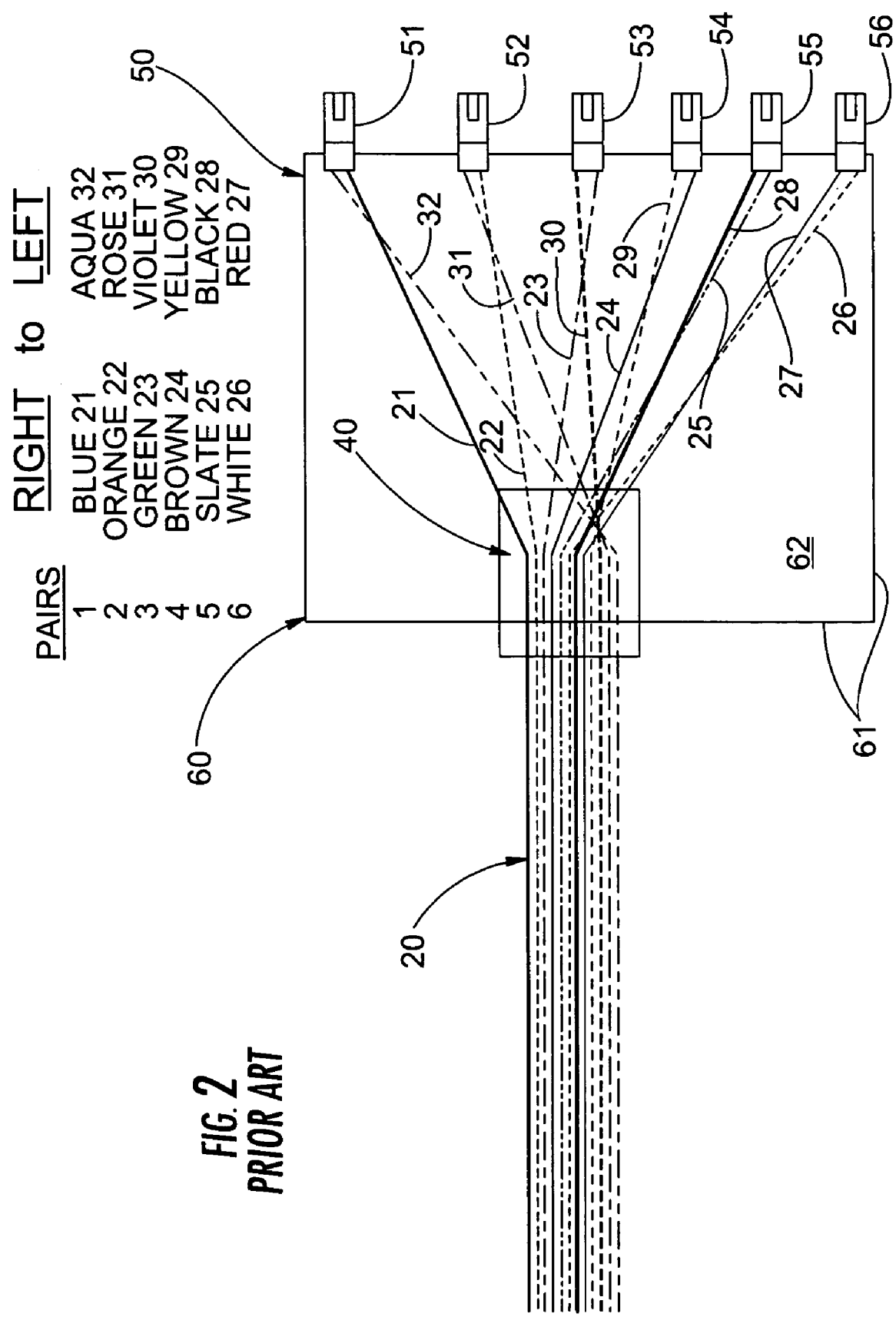
FIG. 2 is a schematic view of the key up to key up universal wiring module.
Figure 4:
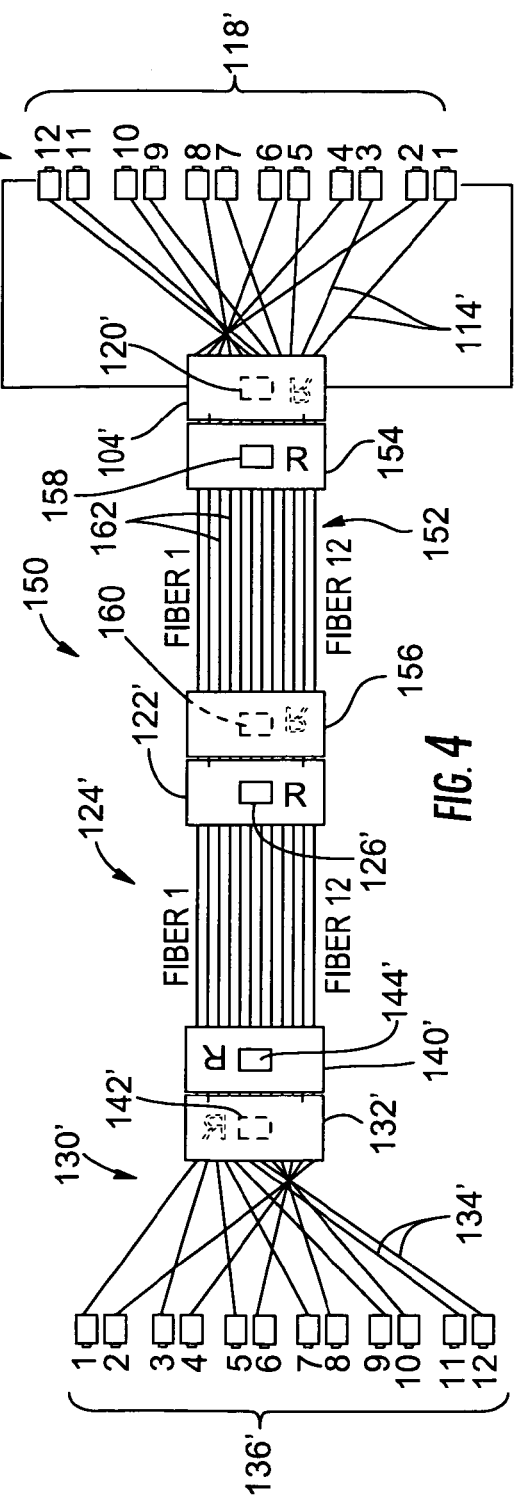
FIG. 4 is a schematic view of a second optical assembly system according to the present invention.

Another embodiment of an optical assembly system according to the present invention is illustrated in FIG. 4. The system 150 of FIG. 4 is essentially the same as the system 100 of FIG. 3, except that an extender trunk 152 has been added between the module 102' and the non-standard trunk line 124'. The extender trunk 152 has optical fibers 162 positioned between two connectors 154,156, which are preferably MTP or MPO connectors as with the other connectors for the system 100 described above. The extender trunk 152 is configured differently from the trunk line 124' in that rather than having the connectors 154,156 being both key up (or key down), the connector 154 has the key 158 in the up position to mate with connector 104' in a key up to key down configuration. The other connector 156 has the key 160 down to mate with the connector 122' in a key up to key down orientation. The optical fibers 162 in extender trunk 152 are inserted into the connectors 154,156 in the standard format, i.e., the blue fiber (fiber 1) is on the right with the key in the up position, as indicated by the reference letter R in FIG. 3 and FIG. 4. In the universal wiring module depicted in FIG. 2, one of the ends of the extender trunk 152 would have to have a ribbon twist connector since both of the connectors 154,156 would have to have their orientation keys 158,160 in the key up orientation.

It will be apparent to those skilled in the art that various modifications and variations can be made in the present invention without departing from the spirit or scope of the invention. Thus, it is intended that the present invention cover the modifications and variations of the inventions provided they come within the scope of the appended claims and their equivalents.

We claim:

1. An optical interconnection module, comprising:
 a) an enclosure comprising wall areas;
 b) an optical interconnection section formed in one of the wall areas of said enclosure, said optical interconnection section having a first multi-fiber connector with a plurality of optical fibers extending therefrom, the multi-fiber connector having an orientation key and an end face configured to define a predetermined angle, the predetermined angle being positioned relative to the orientation key;
 c) an optical connector station formed in another one of the wall areas of said enclosure, the optical connector station having a plurality of optical fiber connectors associated therewith;
 d) the first multi-fiber connector and the plurality of optical fiber connectors being optically interconnected to each other, the optical fibers extending from the first multi-fiber connector disposed in said enclosure, at least two optical fibers connected to the first multi-fiber connector immediately adjacent one another are connected to optical fiber connectors in the optical connector station that are not immediately adjacent one another; and
 e) the first multi-fiber connector operable for being connected to a second multi-fiber connector, the second multi-fiber connector having an orientation key and an end face configured to define the same predetermined angle and oriented to the orientation key as the first multi-fiber connector such that when the first and second multi-fiber connectors are connected, the orientation keys are on opposite sides of the connected multi-fiber connectors.

2. The optical interconnection module according to claim 1, wherein the predetermined angle is about zero degrees (0°).

3. The optical interconnection module according to claim 1, wherein the predetermined angle is about eight degrees (8°).

4. The optical interconnection module according to claim 1, wherein the optical fiber connectors are single fiber connectors.

5. The optical interconnection module according to claim 1, wherein the end face configured to define a predetermined angle comprises a polished surface area.

6. An optical interconnection module, comprising:
 a) an enclosure defining wall areas;
 b) an optical interconnection section formed in one of the wall areas of said enclosure, said optical interconnection section having a first multi-fiber connector with a plurality of optical fibers extending therefrom, the multi-fiber connector having an orientation key and an end face configured to define a predetermined angle other than about zero degrees (0°), the predetermined angle being positioned relative to the orientation key;
 c) an optical connector station formed in another wall area of said enclosure, the optical connector station having a plurality of optical fiber connectors; and
 d) the first multi-fiber connector and the plurality of optical fiber connectors being optically interconnected to each other by the optical fibers extending from the first multi-fiber connector disposed in said enclosure, at least two optical fibers connected to the multi-fiber connector immediately adjacent one another are connected to optical fiber connectors in the optical connector station that are not immediately adjacent one another, and
 wherein a connection of the multi-fiber connector to another multi-fiber connector has an optical reflective performance of about $\leq -65$ dB.

7. The optical interconnection module according to claim 6, wherein the multi-fiber connectors are connected in a key up to key down orientation.

8. The optical interconnection module according to claim 6, wherein the multi-fiber connectors each have an end face polished to an angle of about eight degrees (8°), the polished end face being positioned relative to the orientation key.

9. An optical interconnection harness comprising;
   a first end having a multi-fiber connector, the multi-fiber connector having an orientation key and an end face configured to define a predetermined angle other than about zero degrees (0°), the predetermined angle of the end face being positioned relative to the orientation key on the multi-fiber connector;
   a second end having a plurality of optical fiber connectors positioned relative to one another; and
   a plurality of optical fibers connecting the multi-fiber connector and the plurality of optical fiber connectors such that at least two optical fibers connected to the multi-fiber connector immediately adjacent one another are connected to optical fiber connectors in the second end that are not immediately adjacent one another.

10. The optical interconnection harness according to claim 9, wherein the end face configured to define a predetermined angle comprises a polished surface area.

11. The optical interconnection harness according to claim 9, wherein a connection of the multi-fiber connector to another multi-fiber connector has a reflective performance of about ≦−65 dB.

12. The optical interconnection harness according to claim 9, wherein the optical fiber connectors are single fiber connectors.

* * * * *